United States Patent [19]

Witte

[11] 4,371,263

[45] Feb. 1, 1983

[54] DOUBLE MONOCHROMATOR

[75] Inventor: Wolfgang W. F. Witte, Uberlingen, Fed. Rep. of Germany

[73] Assignee: Bodenseewerk Perkin-Elmer & Co., GmbH, Uberlingen, Fed. Rep. of Germany

[21] Appl. No.: 922,405

[22] Filed: Jul. 6, 1978

[30] Foreign Application Priority Data

Jul. 7, 1977 [DE] Fed. Rep. of Germany ....... 2730613

[51] Int. Cl.² .............................................. G01J 3/18
[52] U.S. Cl. .................................................... 356/333
[58] Field of Search ............................... 356/333, 334

[56] References Cited

U.S. PATENT DOCUMENTS

| | | | |
|---|---|---|---|
| 3,418,051 | 12/1968 | Staunton | 356/333 |
| 3,431,054 | 3/1969 | Doonan et al. | 356/334 |
| 3,749,498 | 7/1973 | Shimomura | 356/333 |
| 3,817,633 | 6/1974 | White | 356/333 X |
| 3,865,490 | 2/1975 | Grossman | 356/333 |

OTHER PUBLICATIONS

Kriman, "Double Monochromator with Two Diffraction Gratings", *Optics and Spectroscopy* vol. 31, No. 6, Dec. 1971, p. 562.

James et al., *The Design of Optical Spectrometers*, 1969, Chapman and Hall, Ltd., pp. 58, 59 and 72.

*Primary Examiner*—F. L. Evans
*Attorney, Agent, or Firm*—S. A. Giarratana; F. L. Masselle; E. T. Grimes

[57] ABSTRACT

A double monochromator having a principal stage and a pre-monochromator or first stage that includes a coarse reflecting plane diffraction grating and a concave mirror for converging the object beam on the grating and for imaging the selected band of diffracted light from the grating on the entrance slit of the principal or second stage. The first stage spectral bandwidth is much larger than the second stage, thus permitting use of a grating having a groove spacing approximately ten times that of the second stage grating, and the use of linear wavelength adjusting means. The imaging mirror results in a shorter image and object distance and therefore a smaller convenient instrument.

21 Claims, 2 Drawing Figures

DOUBLE MONOCHROMATOR

BRIEF SUMMARY OF THE INVENTION

In conventional diffraction grating monochromators, a light source is imaged on an entrance slit located in the focal plane of a concave mirror or lens that collimates the light beam passing through the slit and directs it to a diffraction grating. The diffracted light from the grating consists of collimated beams of various wavelengths dispersed into different directions depending upon their respective wavelengths. A refocusing lens or concave mirror is then positioned to focus the diffracted light images of the entrance slit into the plane of an exit slit so that a selected band of the diffracted light passes through the exit slit. The diffraction grating is generally arranged to be rotated about an axis parallel to the entrance slit by a wavelength drive mechanism that may be adjusted to project a selected narrow spectral band into the exit slit. By thus rotating the grating, the spectrum can be shifted laterally relative to the exit slit and the entire spectral range may be scanned. The rotation is generally effected through a sine transmission so that the sine of the angle of rotation is proportional to the displacement setting of the wavelength drive. One problem encountered with diffraction grating monochromators is that the grating can diffract several orders of wavelength in the same direction so that not only the first order of radiation, but also the second order of the half wavelength, the third order of the third wavelength, etc., may be superposed on the exit slit. To avoid this difficulty, filters are generally placed in front of the conventional grating monochromators to filter out the higher orders. These filters may be arranged in a filter wheel coupled with the wavelength drive and extending into the path of the beam after passing the entrance slit.

A further problem occurring with these single monochromators results from stray light. It is impossible to prevent small amounts of light of different wavelengths from entering the entrance slit and from reaching the exit slit by scattering along other paths within the system so that undesired undispersed radiation appears at the exit slit. The most effective way of overcoming this difficulty is to pass the emerging light from the monochromator through a similar monochromator, thereby creating a two-stage or double monochromator. Such double monochromators are well-known and generally comprise identical units in which the exit slit of the first stage forms the entrance slit of the second stage. The identical diffraction gratings of the two stages are positioned in collimated beams and each grating is synchronously driven by a wavelength drive through one sine transmission mechanism. As with conventional single-stage monochromators, a filter wheel is generally positioned behind the entrance slit to eliminate higher orders of radiation.

In double monochromators, a narrow spectral band generated by the first stage is passed for further dispersion in the second stage so that no undesirable radiation gets into the entrance slit of the second stage. Since these prior art double monochromators are, in effect, two identical single-stage units in series with a mechanically coupled wavelength mechanism, it is apparent that their principal drawbacks are the doubled cost, the difficulty of proper alignment of the complete optical system, and large and inconvenient dimensions of the system.

It is the object of this invention to provide a double monochromator which, by appropriate selection of spectral band width of the first stage, results in simplification of construction, ease of optical alignment, and a small convenient instrument having an efficiency and accuracy comparable to the traditional more expensive instruments.

Briefly described, the present invention is for a double diffraction grating monochromator having a first stage spectral bandwidth substantially larger than that of the second stage, thereby permitting a wavelength adjustment of the grating by a simplified linear mechanism. The increased bandwidth permits use of a coarse diffraction grating that is positioned in either a diverging or converging beam and selected spectral bands from the grating are imaged by a concave mirror on the second stage entrance slit. Object and image distances are thus reduced and the wavelength dependent focal plane at the entrance slit is axially displaced by only a small amount that does not deleteriously affect accuracy.

In the drawings that illustrate a preferred embodiment of the invention:

FIG. 1 is a schematic plan view illustrating the basic elements of the double monochromator of the invention;

and

FIG. 2 is a drawing illustrating the path of rays imaged at the entrance slit of the second stage of the monochromator of FIG. 1.

DETAILED DESCRIPTION OF THE PREFERRED EMBODIMENT

Figures 1, 2:
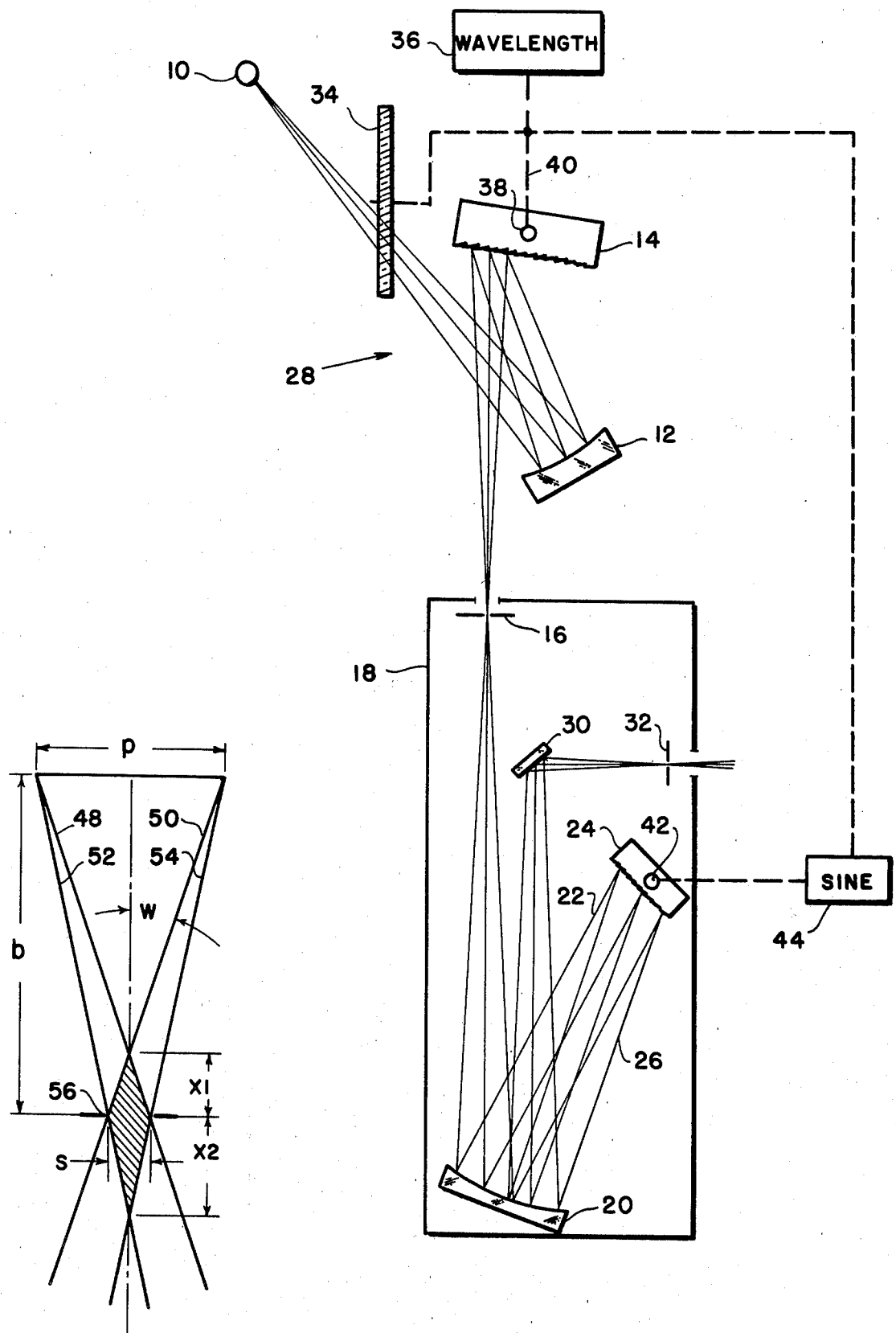

Referring now to the schematic diagram of FIG. 1, light source 10 emanates a light which is imaged by a spherical concave mirror 12 to the surface of a diffraction grating 14 and thence to the entrance slit 16 of the principal monochromator 18, hereinafter referred to as the second stage. Second stage 18 includes a concave collimating mirror 20, the focal plane of which is in the plane of the entrance slit 16. Mirror 20 thus images the entrance slit 16 in a collimated beam 22 which is directed to the surface of a diffraction grating 24. Diffraction grating 24 returns a collimated beam 26 for each diffracted wavelength against the surface of the mirror 20 and thence to the plane mirror 30 and to the exit slit 32. A filter wheel 34 is interposed in the diverging light path between light source 10 and the concave mirror 12 in the first stage 28. The filter wheel 34 is rotatable under the control of a wavelength drive mechanism 36 which also serves to rotate the grating 14 about an axis 38 through a linear drive mechanism 40 which may, if desired, be a suitably geared toothed belt. The wavelength drive 36 also serves to rotate the second stage diffraction grating 24 about its axis 42 through a sine transmission 44. Since transmissions are well-known in the art and generally include a rotatable spindle and travelling nut coupled to a lever attached to the grating so that rotation of the spindle will rotate the grating 24 in a way that the sine of the angle of rotation of the grating is proportional to the setting in the wavelength drive 36.

The operation of the double, or two-stage monochromator is as follows. Diverging light from the source 10 passes through the filter wheel 34 and against the spherical concave mirror 12 which converges the light beam against the surface of the diffraction grating 14 which, disperses the converging rays according to their wavelengths. A particular narrow band of wavelengths selected by the wavelength drive 36 is imaged on the exit slit 16 which, is a double monochromator, is also the entrance slit of the second stage 18. The very narrow wavelength band in the slit 16 is reflected by the collimating mirror 20 against the surface of the diffraction grating 24 which disperses the incident collimated rays according to their wavelengths. The grating 24 is rotated by the sine mechanism 44 so that a selected wavelength is returned to the mirror 20 and reflected by the plane mirror 30 to the exit slit 32.

In the preferred embodiment, diffraction grating 14 of the first stage monochromator 28 has a groove spacing of 1/144 millimeters and the diffraction grating 24 in the principal or second stage monochromator 18 has a spacing of 1/1440 millimeters. The grating 14 is therefore comparatively coarse, an important feature of the invention, since the emerging rays from the coarse grating may be imaged in a plane that remains at a relatively fixed constant image distance independent of the wavelength, as will be subsequently described in more detail. The entrance 16 of the second stage 18 is located in that fixed plane.

FIG. 2 illustrates the formation of the image of the light source 10 in the plane of the entrance slit 16 located a distance, b, from the pupil of width, p, on the surface of the diffraction grating 14. The converging line pair 48 and 50 represent imaged light paths at a wavelength at one end of the spectrum and the converging lines 52 and 54 represent the paths of beams at the opposite end of the spectrum. Light paths 48 and 50 are seen to focus in front of the light source image 56 by a distance, x1, and the paths 52 and 54 focus behind the image 56 by a distance x2. The hatched area common to all four paths is always illuminated from all points of the pupil and receives the full intensity of the illumination. Outside of this hatched core area, the intensity of illumination drops to zero toward the edge of the beam. It is clear, therefore, that during the scan of the various wavelengths by rotation of the grating 14, the image distance, b, must not vary outside of the hatched core area; that is, the entrance slit 16 must always be located in the hatched core area and the design of the grating 14 must be such that the converging image of the light source 10 will fall within the core area from one scan extreme to the other.

The maximum permissible variation in the image distance, b, may be computed as follows:

$$x1 = \frac{sb}{p+s}$$

$$x2 = \frac{sb}{p-s}$$

$$x1 + x2 = \frac{2sbp}{p^2 - s^2}$$

but since $s^2$ is negligible compared with $p^2$, $$x1 + x2 = \frac{2sb}{p}$$

$$\text{Tan } W = \frac{p}{2b} = W \text{ (for small angles)}$$

-continued

Therefore, $X1 + x2 = \frac{s}{W}$

This image distance variation, S/W, during scanning of the wavelength extremes should be smaller than this value and can readily be met with a coarse diffraction grating as proven by the following mathematical discussion.

If:

a = object distance of light source 10 to grating 14 (negative if grating is in converging path, the value then being equal to distance between grating and the virtual light source behind the grating), b = image distance of grating to light source image negative if grating is in diverging path, value is then equal to distance from grating to rear virtual image of emerging beam behind the grating), I = angle of incidence between beam axis and grid normal;

E = angle of emergence between beam axis and grid normal;

A = grating angle of rotation;

f = focal length of the grating;

g = grating constant (or line spacing);

m = order of diffraction; and

λ = wavelength (nm),

Then:

$$b = -a \frac{\cos^2 E}{\cos^2 I}$$

$$f = -a \frac{\cos^2 E}{\cos^2 I - \cos^2 E} = -b \frac{\cos^2 I}{\cos^2 I - \cos^2 E}$$

Therefore:

$$\frac{b}{a} = \frac{\cos^2 E}{\cos^2 I} \qquad [1]$$

Further:

$$\sin E = \frac{m\lambda}{g} - \sin I \qquad [2]$$

In the equation [1] above, it is assumed that incident and emerging rays are near the axis. For off-axis rays which, together with the beam axis, form a finite angle ΔI in the incident beam and ΔE in the converging beam, the equations become:

$$\frac{b}{a} = \frac{\cos^2 E}{\cos^2 I} \cdot \frac{\Delta I}{\Delta E} \qquad [3]$$

and:

$$\sin (E + \Delta E) = \frac{m\lambda}{g} - \sin (I - \Delta I) \qquad [4]$$

Using the above equations, ratios of b/a may be computed for various wavelengths for the coarse grating 14 having a groove spacing of 1/144 mm, the fine grating 24 having a spacing, g, of 1/1440 mm and for various off-axis angles.

TABLE 1

| | b/a ratios for B = 20° and | | |
| | g = 1/1440 mm with finite beam aperture. | | |
| λ (nm) | ΔI = −5° | ΔI = 0 | ΔI = +5° |
| 200 | 1.095 | 1.110 | 1.125 |

TABLE 1-continued b/a ratios for B = 20° and
g = 1/1440 mm with finite beam aperture.

| λ (nm) | ΔI = −5° | ΔI = 0 | ΔI = +5° |
|---|---|---|---|
| 400 | 1.208 | 1.241 | 1.276 |
| 600 | 1.354 | 1.412 | 1.474 |
| 800 | 1.569 | 1.668 | 1.774 |

TABLE 2

| λ (nm) | ΔI = −5° | ΔI = 0 | ΔI = +5° |
|---|---|---|---|
| 200 | 1.009 | 1.010 | 1.012 |
| 400 | 1.018 | 1.021 | 1.024 |
| 600 | 1.027 | 1.031 | 1.036 |
| 800 | 1.037 | 1.042 | 1.048 |

By examining the results listed in Table 1, it can readily be seen that a fine grating, such as the grating 24 having a line spacing of 1/1440 mm, has a ratio variation of approximately 50% between wavelengths of 200-800 nm, or approximately 50 mm in a 100 mm distance. Therefore, if a fine grating were used in the first stage, the image distance, b, will vary greatly over the spectral range and it would be difficult, if not possible, to maintain the image distance within the hatched core of FIG. 2. It follows, therefore, that a fine first stage grating would require an accurately calibrated and costly auxiliary mechanism for adjusting the separation between the first and second stages in order to locate the entrance slit 16 at the appropriate image distance.

The coarse diffraction grating, as actually provided in the grating 14 in the first stage 28, is shown by Table 2 to vary only approximately 3% between wavelength extremes, or only by approximately 3 mm in a 100 mm distance. It now becomes clear that the use of a coarse grating for the diffraction grating 14 eliminates the need for a complex and costly adjustment mechanism between first and second stages and that the image distance, b, will remain within the hatched core of FIG. 2 over the wavelength extremes.

The angular dispersion of the first stage monochromator 28 is:

$$\frac{d\lambda}{dE} = \frac{g}{m} \cos E \quad [5]$$

and the linear dispersion with an imaging ratio of 1:1 by the concave mirror 12 is:

$$\frac{d\lambda}{dx} = \frac{1}{b} \frac{g}{m} \cos E \quad [6]$$

where x is the distance in the plane of the entrance slit 16 normal to the direction of the slit.

As shown in the following table, slightly different numerical values are obtained if E is greater than I, or vice versa.

TABLE 3

Angular dispersion dλ/dE(nm/rad) for B = 20° and
g = 1/144 mm.

| λ (nm) | E less than I | E greater than I |
|---|---|---|
| 200 | 6942 | 6589 |
| 400 | 6893 | 6187 |
| 600 | 6675 | 5617 |
| 800 | 6252 | 4842 |

An examination of Table 3 will indicate that where E is less than I, there is better dispersion over the entire spectral range. If b = 100 mm, a light source image of 1 mm width yields a spectral band width of between 69 nm and 63 nm.

Angle of rotation of the coarse grating 14 about its axis 38 by the wavelength drive 36 is quite small, varying between 0.9° and 3.4° for wavelengths between 200-800 nm and is rotated linearly with the wavelength. The second stage grating 24, on the other hand, is rotated about its axis 42 so that:

$$\sin A = \frac{m\lambda}{2g \cos B/2} \quad [7]$$

Since the diffraction grating is rotated in the linear relationship with the wavelength from the drive mechanism 36, $$A = C + D\lambda \quad [8]$$

where D represents the reduction ratio between the wavelength and the angular position of the first stage monochromator grating and C represents an adjustment value by which table 4 is adjusted to zero at a chosen wavelength. Consequently the first stage monochromator 28 provides a wavelength λ' that is slightly different from 80 at the center of its spectral band. If the values of C and D are selected so that λ=λ' at the ends of the wavelength range, the following is obtained for B=20°.

TABLE 4

| Wavelength Deviation λ' − λ (nm) | |
|---|---|
| λ (nm) | λ' − λ (nm) |
| 200 | 0.00 |
| 300 | 0.05 |
| 400 | 0.09 |
| 500 | 0.14 |
| 600 | 0.13 |
| 700 | 0.09 |
| 800 | 0.00 |

This deviation can be reduced even further if the values of C and D are selected so that a small negative deviation appears at each end of the spectral range.

The foregoing computations and discussion in connection with wavelength deviation and actual image displacement within the image core area also remain valid if the first stage grating 14 is located in a diverging path of rays so that the deviations and displacements occur at the virtual images. The imaging on the entrance slit 16 by the concave mirror 12 does not alter the computations except for a change in sign. If the grating 14 is located in a diverging path, it must be poitioned between the light source 10 and the concave mirror 12 so that the mirror may image the incident dispersed rays from the grating in the plane of the entrance slit 16.

In review, the above computations show:
(1) By the use of a rather coarse diffraction grating 14, wavelength dependent variations in image distance remain within tolerable limits and the entrance slit 16 is always fully illuminated.
(2) Small variations or aberrations caused by the finite aperture angle of the beam are negligible.
(3) Spectral bandwidth of the first stage monochromator 28 is substantially larger (between 69 nm and 63 nm) than the spectral bandwidth of the principal or second stage monochromator.
(4) The rotation of the diffraction grating 14 proportional to the wavelength results in negligible deviations from the wavelength generated by the sine rotations of the fine second stage monochromator grating 24.

Having thus described the invention, what is claimed is:

1. A double monochromator comprising:
a first monochromator stage, and
a second monochromator stage having entrance and exit slits,
said first monochromator stage including means for generating, from light rays received from a light source, a first spectral band having a predetermined bandwidth, and means for imaging said first spectral band at the entrance slit of said second monochromator stage;
said second monochromator stage including means for generating from the first spectral band of light imaged at the entrance slit, a second spectral band having a predetermined bandwidth, and means for imaging said second spectral band at the exit slit of said second monochromator stage;
the generating means of said first monochromator stage being disposed to generate a spectral bandwidth substantially greater than the spectral bandwidth generated by the generating means of said second monochromator stage.

2. The double monochromator according to claim 1 wherein the generating means of the first monochromator stage includes a diffraction grating disposed to disperse non-collimated light received from the light source.

3. The double monochromator according to claim 1 wherein the generating means of said first and second monochromator stages include respective first and second diffraction gratings, and a wavelength drive mechanism for synchronously rotating said first and second diffraction gratings.

4. The double monochromator according to claim 3 wherein said first diffraction grating is substantially linearly rotated by said wavelength drive mechanism.

5. The double monochromator according to claim 4 wherein said second diffraction grating is nonlinearly rotated by said wavelength drive mechanism.

6. The double monochromator according to claim 3 further including a rotatable filter wheel interposed in the path of diverging rays from the light source, said wheel being coupled to said wavelength drive mechanism for rotation with the adjustment of said first and second gratings.

7. The double monochromator according to claim 1 wherein the generating means of said first monochromator stage includes a first diffraction grating, said means for imaging the first spectral band including a concave mirror interposed between the light source and said first diffraction grating for converging light rays from the source on said grating and for imaging the diffracted rays at said second stage entrance slit.

8. The double monochromator according to claim 7 wherein said second monochromator stage includes a second diffraction grating, and a wavelength drive mechanism for synchronously rotating said first and second diffraction gratings.

9. The double monochromator according to claim 8 wherein said first diffraction grating is substantially linearly rotated by said wavelength drive mechanism.

10. The double monochromator according to claim 9 wherein said second diffraction grating is non-linearly rotated by said wavelength drive mechanism.

11. The double monochromator according to claim 1 wherein the generating means of said first monochromator stage includes a first diffraction grating positioned to receive a diverging path of rays from the light source, and said means for imaging the first spectral band including a concave mirror positioned to receive the diverging rays emerging from said first grating and to image said rays in a converging path at said second stage entrance slit.

12. The double monochromator according to claim 11 wherein said second monochromator stage includes a second diffraction grating, and a wavelength drive mechanism for synchronously rotating said first and second diffraction gratings.

13. The double monochromator according to claim 12 wherein said first diffraction grating is substantially linearly rotated by said wavelength drive mechanism.

14. The double monochromator according to claim 13 wherein said second diffraction grating is non-linearly rotated by said wavelength drive mechanism.

15. The double monochromator as set forth in claim 7 wherein said first diffraction grating and said concave mirror are positioned in said first stage so that the image distance from said first grating to said second stage entrance slit will vary by an amount not exceeding the ratio S/W, in which S is the width of the light source image, and W is the aperture angle of the beam converging at the image plane.

16. The double monochromator as set forth in claim 11 wherein said first diffraction grating and said concave mirror are positioned in said first stage so that the image distance from said first grating to said second stage entrance slit will vary by an amount not exceeding the ratio S/W, in which S is the width of the light scorce image, and W is the aperture of the beam coverging at the image plane.

17. The double monochromator according to claim 1 wherein the generating means of the first and second monochromator stages include respective first and second diffraction gratings each with spaced grooves, said first diffraction grating having a groove spacing approximately ten times the groove spacing of said second diffraction grating.

18. The double monochromator according to claim 17 wherein the groove spacing of said first diffraction grating is approximately 1/144 millimeters.

19. The double monochromator according to claim 1 wherein the generating means of said first monochromator stage is disposed to generate a spectral bandwidth at least an order of magnitude greater than the spectral bandwidth generated by the generating means of said second monochromator stage.

20. The double monochromator according to claim 7 wherein said second monochromator stage includes a second diffraction grating, said first and second diffraction gratings having grooves for generating from said first grating a spectral bandwidth at least an order of magnitude greater than the spectral bandwidth generated by said second diffraction grating.

21. The double monochromator according to claim 11 wherein said second monochromator stage includes a second diffraction grating, said first and second diffraction gratings having grooves for generating from said first grating a spectral bandwidth at least an order of magnitude greater than the spectral bandwidth generated by said second diffraction grating.

* * * * *